Patented Feb. 19, 1929.

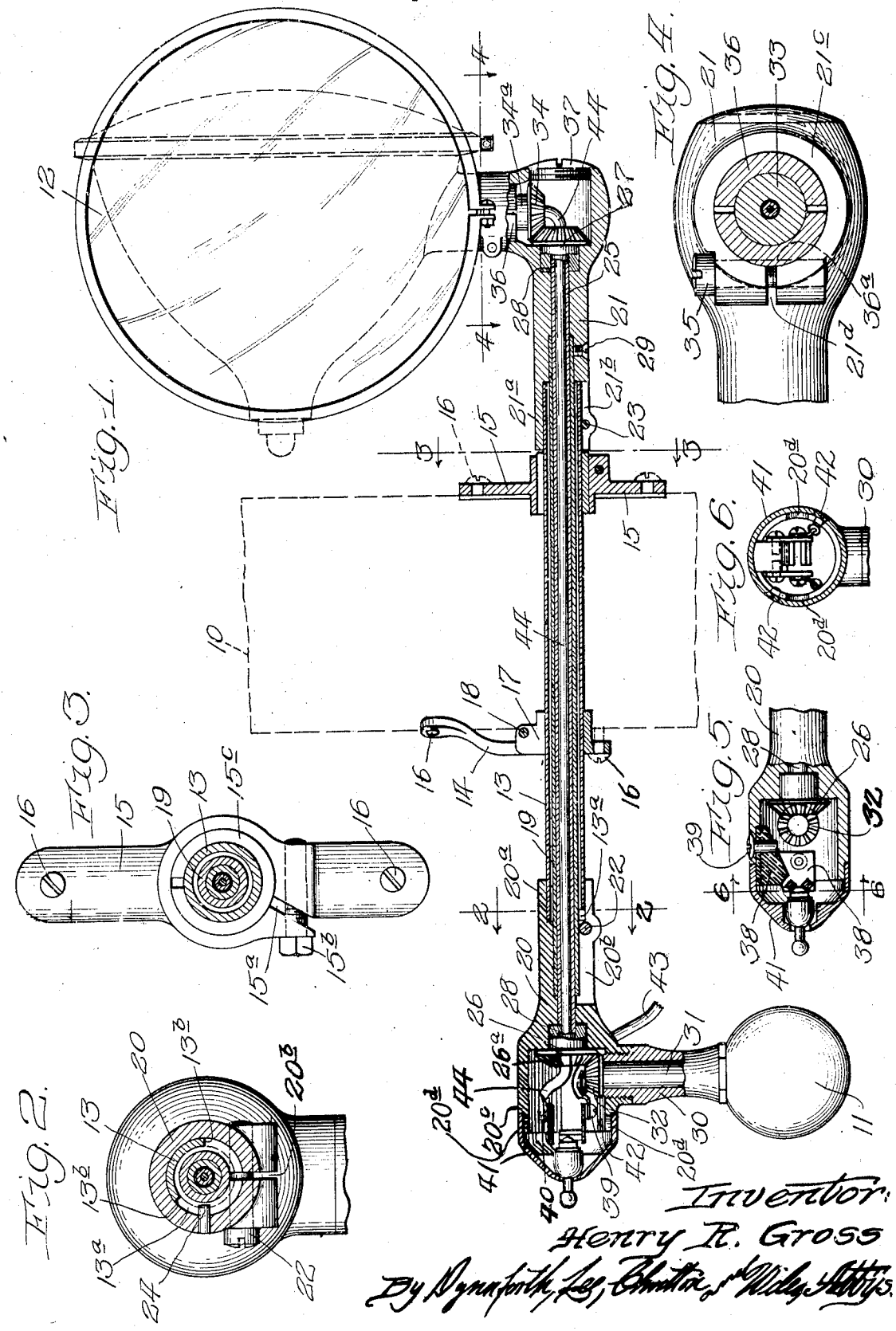

1,702,772

UNITED STATES PATENT OFFICE.

HENRY R. GROSS, OF CHICAGO, ILLINOIS.

SPOTLIGHT.

Application filed April 28, 1927. Serial No. 187,196.

This invention relates to improvements in spot lights and more especially to dirigible or adjustable spot lights adapted for use on a vehicle, for example, a motor vehicle. The spot light I have shown is of the general type that is adjustable or rotatable in planes intersecting at right angles, thus making it universally adjustable. For example, with the light in its normal position standing upright and facing straight ahead, it may be rocked in a vertical plane and also turned in a horizontal plane. Both adjustments are effected by a single handle and the two movements of the light may be given simultaneously.

Among the features of my invention is the provision of improved means for fastening the bevel gears on the ends of the inner shaft, the means for limiting the rotation of the light on its vertical axis, and the means for limiting the rocking movement of the light on the horizontal axis, both of said last mentioned means being adjustable.

Another feature of my invention is the improved switch mounted on an extension on the handle housing to permit the switch connections to be made after the switch is in place.

Another feature of my invention is the provision of extension sleeves on the handle support and the lamp support, said extension sleeves overlapping the ends of the fixed outer tubular guide, thus excluding dirt from the bearing.

Another feature of my invention is the recessing of one end of the fixed outer tubular bearing, said recess cooperating with a pin in the handle support to act as a stop to limit the rocking movement of the lamp, said fixed outer tubular guide being rotatably adjustable to give the adjustment required.

Another feature of the invention is the slotting of one of the extension sleeves heretofore referred to to permit the same to act as a friction clamp on one end of the tubular guide to give the desired friction in the rocking adjustment of the light.

I have also provided improved means for limiting the rotation of the light on its vertical axis, said means comprising the provision of a solid tooth in one of the bevel gears to act as a stop.

Among the features of my invention, also, is improved and novel means for mounting the lamp in the lamp support, and means for providing the desired friction in the rotation of the lamp on its vertical axis.

My improved spot light may be constructed at relatively low cost and is very durable and exact in operation. My improved device also permits the use of solid die castings for both the handle and lamp supports. Other features and advantages of my invention will appear more fully as I proceed with my specification.

In that form of device embodying the features of my invention shown in the accompanying drawings, Figure 1 is a vertical sectional view;

Fig. 2 is a view taken as indicated by the line 2 of Fig. 1;

Fig. 3 is a view as indicated by the line 3 of Fig. 1;

Fig. 4 is a view taken as indicated by the line 4 of Fig. 1;

Fig. 5 is a horizontal sectional view through the switch, and,

Fig. 6 is a view taken as indicated by the line 6 of Fig. 5.

As shown in the drawings, 10 indicates a part of the body of a car on which the spot light is mounted. For the purpose of illustration, this may be considered as the corner post of an enclosed car, or any wall or part thereof. In the case of a closed car such as, for example, a sedan or coupé, the part 10 may be the forward corner post, and when the spot light is mounted thereon, the operating handle 11 may be inside of the car and the light 12 outside, the handle 11 preferably being within easy reach of the driver.

13 indicates an outer fixed tubular guide which may be carried on or supported by a part of the car in any suitable manner, as, for example, in mounting the light on a closed car, this tubular guide 13 may extend through a hole in the corner post 10 and be held in position by the inner and outer clamps 14 and 15 respectively. These clamps may be fastened to the corner post 10 in any suitable manner, as, for example, by the screws 16 and one or both is preferably split as indicated by 17 and drawn together by means of a bolt 18 in the usual manner to clamp the guide 13 firmly and prevent it from rotating or slipping endwise.

I have shown the clamp 15 as also split at 15$^a$ and adapted to be tightened by means of the bolt 15$^b$ to constrict the split collar 15$^c$ and thus clamp the guide 13 (see Fig. 3).

Rotatably mounted within the outer fixed tubular guide 13 is the hollow rock shaft 19 carrying on its inner end the handle support 20 and on its outer end the lamp support 21, each of these being provided with a sleeve extension 20$^a$ and 21$^a$ respectively, overlapping the ends of the guide 13 and thus excluding dirt from the bearing. The handle support 20 is provided with a slot 20$^b$ through a part of the sleeve extension 20$^a$ and a bolt 22 is provided to draw this slot together to clamp the handle support 20 firmly on the end of the rock shaft 19. The sleeve extension 21$^a$ on the lamp support 21 is also provided with a slot 21$^b$ and a bolt 23 serves to draw this slot together to tighten the sleeve 21$^a$ on the end of the guide 13 in order to give the desired frictional resistance to the rocking movement of the light.

One end of the tubular guide 13 (here shown as the inner) is also cut or recessed through a part of its circumference as indicated by 13$^a$ and the support 20 is provided with a pin 24 cooperating with the recess 13$^a$ to limit the rocking movement of the light, said pin striking the shoulders 13$^b$ as stops. Adjustment of the limitation of the rocking movement may be very easily effected by loosening the clamps 14 and 15 and rotating the tubular guide 13 therein to the desired position.

Rotatably mounted within the rock shaft 19 is the hollow lamp rotating shaft 25 carrying on the inner end the bevel gear 26 and on the outer end the bevel gear 27. Each of these gears is prevented from rotating on the shaft 25 by means of the internal key 28 engaging a suitable key-way on the shaft 25.

The lamp support 21 may be fastened on the rock shaft 19 in any suitable manner as, for example, by means of the set-screw 29.

Threaded into one side of the handle support 20 is the tubular extension 30 carrying the short handle shaft 31 having mounted on the end of it the bevel gear 32 meshing with the bevel gear 26. The outer end of the shaft 31 carries the operating handle 11.

The lamp 12 is mounted on the lamp support 21 in the following manner. The lamp is carried by a lamp post 33 having on its lower end a bevel gear 34 meshing with the bevel gear 27. The lamp support 21 is provided with an upwardly turned extension 21$^c$ which is slotted at 21$^d$. A bolt 35 is provided to constrict the end 21$^c$ and narrow the slot 21$^b$. Surrounding the shaft 33 is a split collar 36 which is provided with a groove 36$^a$ engaged by the bolt 35 to prevent the collar 36 from being lifted out when the bolt 35 is in place. The bolt 35 is tightened in order to squeeze the collar 36 and thus give the desired frictional engagement on the shaft 33 to prevent too free rotation of the lamp. It will thus be seen that the bolt 35 serves to prevent the lamp from being lifted out of the lamp support and also gives the desired frictional adjustment to the rotation thereof. The lifting out is prevented by the engagement of the bolt 35 with the groove 36$^a$ in the collar 36 and this also holds the shaft 33 in place as the hub 34$^a$ on the bevel gear 34 is larger than the hole in the collar 36.

The outer end of the lamp support 21 is provided with a hole at the end through which the bevel gear 27 may be inserted and this hole is closed by suitable cover 37.

The inner end of the handle support 20 is provided with an extension 20$^c$ which holds therein the electric switch 38, the same being held in place by means of a screw 39. This switch may be of any suitable construction and is here shown as comprising the block 38 provided with the two terminal screws 39 and 40 respectively. It will be seen that the block 38 is mounted inwardly far enough so that the terminal screws 39 and 40 are accessible from the outside after the switch block is in place, and for this purpose the inner end of the extension 20$^c$ is provided with two cut-away portions 20$^d$. It will be seen, therefore, that after the switch is in place the wire connections may be made. 41 indicates a cover over the end of the extension 20$^c$ held in place by means of the screws 42.

43 indicates a suitable electric wire leading to one of the terminals of the switch from any source of electric energy (not shown). 44 indicates a wire leading from the other switch terminal through the hollow shaft 25 to the bulb (not shown) in the light 12. The other terminal of the bulb is grounded in the usual manner.

The bevel gear 26 is provided with a solid tooth 26$^a$ to limit the rotation of the shaft 25; and it will be seen that any suitable adjustment may be provided by meshing the gears 27 and 34 in the desired positions. The solid tooth 26$^a$ on the bevel gear 26 limits rotation of the lamp 12 on its vertical axis as has been stated. It is a great advantage in limiting the rotation in this manner. The stop being located close to the handle 11 prevents the strain from being transmitted through other parts of the mechanism.

It is to be noted that the handle support 20 and the lamp support 21 are so designed, and the other parts cooperating therewith are so designed and shaped, that no undercut is required in either of the supports 20 or 21. This feature is important and by its use both of these supports may be solid die castings which cannot easily be formed if undercuts are required.

It is to be noted that the split collar 15° lies inside of the clamp 15. The clamp 15 is made large enough to accommodate a hardened steel bushing as a guide for a drill to make the hole in the corner post for installing the clamp. After the hole has been drilled the steel bushing is removed and the split collar 15° inserted in place of it.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is new, and desire to secure by Letters Patent, is:

1. In a spot light; an outer tubular guide, having one end recessed through a part of its circumference, said recessed portion terminating in shoulders; means for mounting said guide on a vehicle to permit rotatable adjustment thereof, said means including a split collar surrounding the tubular guide and a clamp surrounding said split collar; a hollow rock shaft rotatably mounted in said guide; a handle support carried on the inner end of said rock shaft, and a lamp support carried on the outer end of said rock shaft, one of said supports being provided with a part lying in the recess at the end of the tubular guide and adapted to engage the shoulders at the ends thereof to limit the rocking of the rock shaft; a lamp rotatably mounted in said lamp support; a handle rotatably mounted in said handle support; and means mounted in the rock shaft operatively connecting the handle with the lamp whereby rotation of the handle will rotate the lamp in the lamp support.

2. In a spot light; an outer tubular guide, having one end recessed through a part of its circumference, said recessed portion terminating in shoulders; means for mounting said guide on a vehicle to permit rotatable adjustment thereof, said means including a split collar surrounding the tubular guide and a clamp surrounding said split collar; a hollow rock shaft rotatably mounted in said guide; a handle support carried on the inner end of said rock shaft, and a lamp support carried on the outer end of said rock shaft, one of said supports being provided with a part lying in the recess at the end of the tubular guide and adapted to engage the shoulders at the ends thereof to limit the rocking of the rock shaft, and one of said supports having an extension sleeve overlapping the end of said guide; a lamp rotatably mounted in said lamp support; a handle rotatably mounted in said handle support; and means mounted in the rock shaft operatively connecting the handle with the lamp whereby rotation of the handle will rotate the lamp in the lamp support.

3. In a spot light; an outer tubular guide, having one end recessed through a part of its circumference, said recessed portion terminating in shoulders; means for mounting said guide on a vehicle to permit rotatable adjustment thereof, said means including a split collar surrounding the tubular guide and a clamp surrounding said split collar; a hollow rock shaft rotatably mounted in said guide; a handle support carried on the inner end of said rock shaft, and a lamp support carried on the outer end of said rock shaft, one of said supports being provided with a part lying in the recess at the end of the tubular guide and adapted to engage the shoulders at the ends thereof to limit the rocking of the rock shaft, and each of said supports having an extension sleeve overlapping the end of said guide; a lamp rotatably mounted in said lamp support; a handle rotatably mounted in said handle support; and means mounted in the rock shaft operatively connecting the handle with the lamp whereby rotation of the handle will rotate the lamp in the lamp support.

4. In a spot light; an outer tubular guide; means for mounting said guide on a vehicle; a hollow rock shaft rotatably mounted in said guide; a handle support carried on the inner end of said rock shaft, and a lamp support carried on the outer end of said rock shaft; a lamp post rotatably mounted in said lamp support; a lamp fixed on the end of said lamp post; a short handle shaft rotatably mounted in said handle support; a handle fixed on the end of said handle shaft; means mounted in the rock shaft operatively connecting the handle shaft with the lamp post whereby rotation of the handle shaft will rotate the lamp post in the lamp support; a split collar with a groove surrounding the lamp post; an upwardly turned split end on the lamp support surrounding said collar; and a bolt through the upwardly turned split end of the lamp support and lying in the groove in the collar, said bolt adapted to squeeze the split end of the lamp support and the split collar on the lamp post to give frictional engagement therewith.

5. In a spot light; an outer tubular guide; means for mounting said guide on a vehicle; a hollow rock shaft rotatably mounted in said guide, a handle support carried on the inner end of said rock shaft, and a lamp support carried on the outer end of said rock shaft; a lamp rotatably mounted in said lamp support; a handle rotatably mounted in said handle support; means mounted in the rock shaft operatively connecting the handle with the lamp whereby rotation of the handle in the handle support will rotate the lamp in the lamp support; an extension on the handle support having two cut-away portions on its outer end; an electric switch mounted in said extension and having two terminals opposite said cut-away portions whereby said terminals may be reached after said switch is mounted in place; and electrical connections between said switch and said lamp.

In witness whereof I have hereunto set my hand this the 26th day of April, A. D. 1927.

HENRY R. GROSS.